US008505946B2

(12) United States Patent
Joo

(10) Patent No.: US 8,505,946 B2
(45) Date of Patent: Aug. 13, 2013

(54) WHEELCHAIR DEVICE

(76) Inventor: Young Han Joo, Ulsan (KR)

( * ) Notice: Subject to any disclaimer, the term of this patent is extended or adjusted under 35 U.S.C. 154(b) by 0 days.

(21) Appl. No.: 13/439,190

(22) Filed: Apr. 4, 2012

(65) Prior Publication Data

US 2012/0267873 A1 Oct. 25, 2012

Related U.S. Application Data

(60) Provisional application No. 61/478,010, filed on Apr. 21, 2011.

(51) Int. Cl.
*B62M 1/14* (2006.01)

(52) U.S. Cl.
USPC .................. 280/250.1; 280/242.1; 280/304.1

(58) Field of Classification Search
USPC ................ 280/250.1, 304.1, 242.1, 252, 244, 280/256, 27, 236, 237, 238, 247
See application file for complete search history.

(56) References Cited

U.S. PATENT DOCUMENTS 3,189,368 A * 6/1965 Petersen .................... 280/250.1
3,877,725 A * 4/1975 Barroza .................... 280/250.1
4,538,826 A * 9/1985 Lemarie .................... 280/250.1
5,037,120 A * 8/1991 Parisi .................... 280/250.1
5,232,236 A * 8/1993 Korpi .................... 280/250.1
6,634,663 B2 * 10/2003 Mitchell .................... 280/250.1
6,755,430 B1 * 6/2004 Watwood et al. .......... 280/250.1
6,889,991 B1 * 5/2005 Facer et al. .................... 280/244
7,296,811 B2 * 11/2007 Pettit .................... 280/250.1
8,186,699 B2 * 5/2012 Green .................... 280/242.1
2006/0208452 A1 * 9/2006 Mittelstaedt .............. 280/250.1
2006/0261571 A1 * 11/2006 Mitchell .................... 280/250.1
2007/0024021 A1 * 2/2007 Rand et al. .................... 280/252
2007/0052196 A1 * 3/2007 Taylor .................... 280/250.1
2008/0238022 A1 * 10/2008 Kylstra et al. ................ 280/244
2009/0206574 A1 * 8/2009 Green .................... 280/250.1

* cited by examiner

*Primary Examiner* — Tashiana Adams
(74) *Attorney, Agent, or Firm* — John K. Park; Park Law Firm

(57) ABSTRACT

A wheelchair comprises a hub-enclosing open ring engaging a hub disposed in a wheel rotatably, bars extending from two ends of the hub-enclosing open ring, an crescent-shaped cap member fixed to the bars above the tube portion, a power handle engaging the crescent-shaped cap member rotatably through an L-shaped end of the power handle, a wheel-holding plate fixed to the power handle with an angle and covered by the crescent-shaped cap member. The wheel-holding plate comprises a holding edge for pressing down on and holding the wheel. The hub-enclosing open ring, the bars, and the cap member are fixed to one another and configured to rotate about the hub, and the holding edge of the wheel-holding pate is configured to be pressed down on and engaged firmly to the wheel such that the wheel rotates about the hub by pushing and pulling the power handle.

19 Claims, 13 Drawing Sheets

WHEELCHAIR DEVICE

RELATED APPLICATION

This application is a non-provisional application corresponding to Provisional U.S. Patent Application Ser. No. 61/478,010 for "Wheelchair Device" filed on Apr. 21, 2011.

BACKGROUND OF THE INVENTION

The present invention relates to a wheelchair device. More particularly, this invention relates to a wheelchair device, which propels a wheelchair in an elevated position not close to or around the wheel of the wheelchair.

Usually, wheelchairs are propelled by a user pushing on hand rims provided on a big rear wheel of the wheelchair. However, such propelling may be hard and inefficient. The wheelchairs have required strong arms of the user for pushing on the hand rims of the wheelchair and propelling the whole wheelchair.

The hand rims for the conventional wheelchairs were attached to the rear wheel and their size was almost same as that of the rear wheel, so as to require strong arms for pushing on them.

Accordingly, a need for a wheelchair device has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a wheelchair device.

Another object of the invention is to provide a wheelchair device, which is powered by an oaring operation of a handle.

Still another object of the invention is to provide a wheelchair device, which is easy to install the new powering handle.

An aspect of the invention provides a wheelchair device.

The wheelchair device comprises:

a hub-supporting disc engaging a hub disposed in a wheel of the wheelchair rotatably;

an arm extending from the hub-supporting disc toward a tube portion of the wheel;

an outer disc fixed to an end of the arm;

a power handle engaging the outer disc with a hinge hooked at an axle fixed to the outer disc rotatably, wherein the hinge is disposed at a position close to an end of the power handle;

a rear wheel-holding protrusion extending inward from an end of the power handle; and a front wheel-holding protrusion extending inward from a position opposite to the rear wheel-holding protrusion with respect to the hinge, wherein the hub-supporting disc, the arm, and the outer disc are fixed to one another and configured to rotate about the hub, wherein each of the rear wheel-holding protrusion and the front wheel-holding protrusion are engaged firmly on the wheel such that the wheel rotate about the hub by pushing and pulling the power handle.

In certain embodiment, the outer disc may have a shape of circle. The axle on the outer disc may be disposed at an off-center location of the a surface of the outer disc and protrudes perpendicularly from the surface.

The front wheel-holding protrusion may be larger than the rear wheel-holding protrusion. The hinge may be disposed closer to the rear wheel-holding protrusion than to the front wheel-holding protrusion.

The power handle may further comprise a grabbing portion at an end opposite to the rear wheel-holding protrusion with respect to the hinge.

Each of the front and rear wheel-holding protrusions from the power handle may engage the wheel with frictional force so as not be slipped by pressing down or lifting up the grabbing portion of the power handle, respectively.

The hub-supporting disc may engage and rotate about the hub substantially frictionlessly.

The hub-supporting disc may engage the hub firmly such that the arm and the outer disc keep a constant distance from the wheel.

The power handle may be adapted to rotate freely about the hub without engaging both of the front and rear wheel-holding protrusions with the wheel.

Another aspect of the invention provides a wheelchair device for a wheelchair.

And the wheelchair comprises:

a hub-enclosing open ring engaging a hub disposed in a wheel of the wheelchair rotatably;

a pair of bars extending from two ends of the hub-enclosing open ring toward a tube portion of the wheel;

an crescent-shaped cap member fixed to the pair of bars above the tube portion of the wheel;

a power handle engaging the crescent-shaped cap member rotatably through an L-shaped end of the power handle;

a wheel-holding plate fixed to the power handle with a predetermined angle and covered by the crescent-shaped cap member, wherein the wheel-holding plate comprises a holding edge for pressing down on and holding the wheel of the wheelchair, wherein the hub-enclosing open ring, the pair of bars, and the crescent-shaped cap member are fixed to one another and configured to rotate about the hub, wherein the holding edge of the wheel-holding pate is configured to be pressed down on and engaged firmly to the wheel such that the wheel rotates about the hub by pushing and pulling the power handle.

The hub-enclosing open ring may be configured to be off-centered from the hub, such that the crescent-shaped cap member and the wheel-holding plate is raised from or lowered to the wheel.

The crescent-shaped cap member and the wheel-holding plate may be raised from or lowered to the wheel by raising or lowering the power handle.

The power handle may engage the crescent-shaped cap member by queuing the L-shaped end of the power handle rotatably through a pair of axle-holes provided in the crescent-shaped cap member.

The wheel-holding plate may be fixed to the power handle by queuing the L-shaped end of the power handle fixedly through a fixing hole provided in the wheel-holding plate.

The wheelchair device may further comprise a hub-adapting member installed around the hub, wherein the hub-adapting member comprises:

a reel-shaped portion adapted to receive the hub-enclosing open ring around thereof and a through-hole in the center for the axle of the wheel;

a base portion fixed to a bottom end of the reel-shaped portion, wherein the base portion is adapted to engage frames of the wheelchair;

a fastening portion provided around the base portion and configured to fasten the hub-adapting member to the wheelchair.

The base portion may comprise one or more vertical grooves and horizontal grooves that fit the frame of the wheelchair.

The fastening portion may comprise a plurality of bolts and nuts.

The wheelchair device may further comprise a top limiter disposed between the pair of bars below the crescent-shaped cap member for keeping the crescent-shaped cap member from falling down and a bottom limiter disposed between the pair of bars above the hub-enclosing open ring for keeping the hub-enclosing open ring from being disengaged entirely.

The advantages of the present invention are: (1) the wheelchair device can be operated with less force than a conventional one; and (2) the wheelchair device can be controlled conveniently without exerting a large force.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
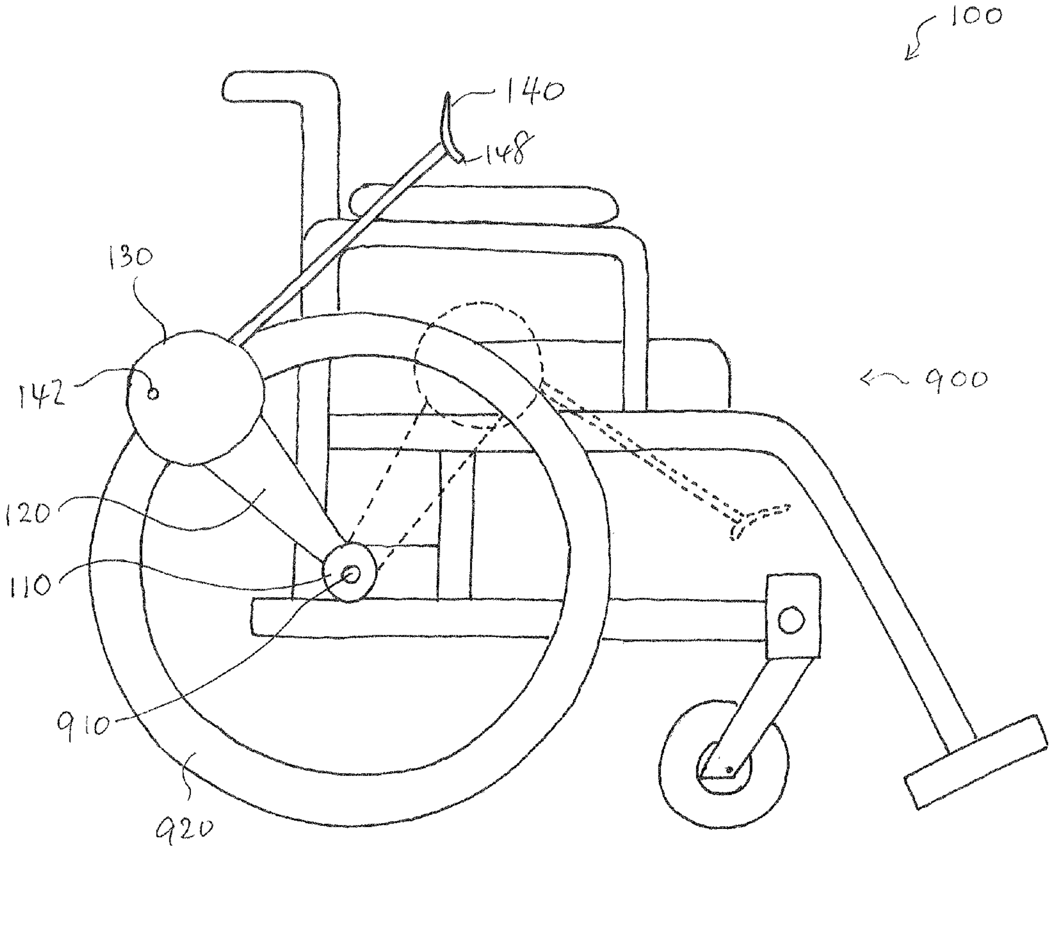
FIG. 1 is a perspective view showing a wheelchair device according to an embodiment of the present invention.

The Provisional U.S. Patent Application Ser. No. 61/478,010 is incorporated by reference into this disclosure as if fully set forth herein.

FIGS. 1-4 show a wheelchair device 100 according to an embodiment of the present invention.

An aspect of the invention provides the wheelchair device 100.

The wheelchair device 100 comprises:

a hub-supporting disc 110 engaging a hub 910 disposed in a wheel 920 of the wheelchair 900 rotatably;

an arm 120 extending from the hub-supporting disc 110 toward a tube portion of the wheel 920;

an outer disc 130 fixed to an end of the arm 120;

a power handle 140 engaging the outer disc 130 with a hinge 142 hooked at an axle fixed to the outer disc 130 rotatably, and the hinge 142 is disposed at a position close to an end of the power handle 140;

a rear wheel-holding protrusion 144 extending inward from an end of the power handle 140; and a front wheel-holding protrusion 146 extending inward from a position opposite to the rear wheel-holding protrusion 144 with respect to the hinge 142.

The hub-supporting disc 110, the arm 120, and the outer disc 130 are fixed to one another and configured to rotate about the hub 910.

Each of the rear wheel-holding protrusion 144 and the front wheel-holding protrusion 146 are engaged firmly on the wheel 920 such that the wheel 920 rotate about the hub 910 by pushing and pulling the power handle 140.

In certain embodiment, the outer disc 130 may have a shape of circle. The axle 142 on the outer disc 130 may be disposed at an off-center location of the a surface of the outer disc 130 and protrudes perpendicularly from the surface.

Figure 2:
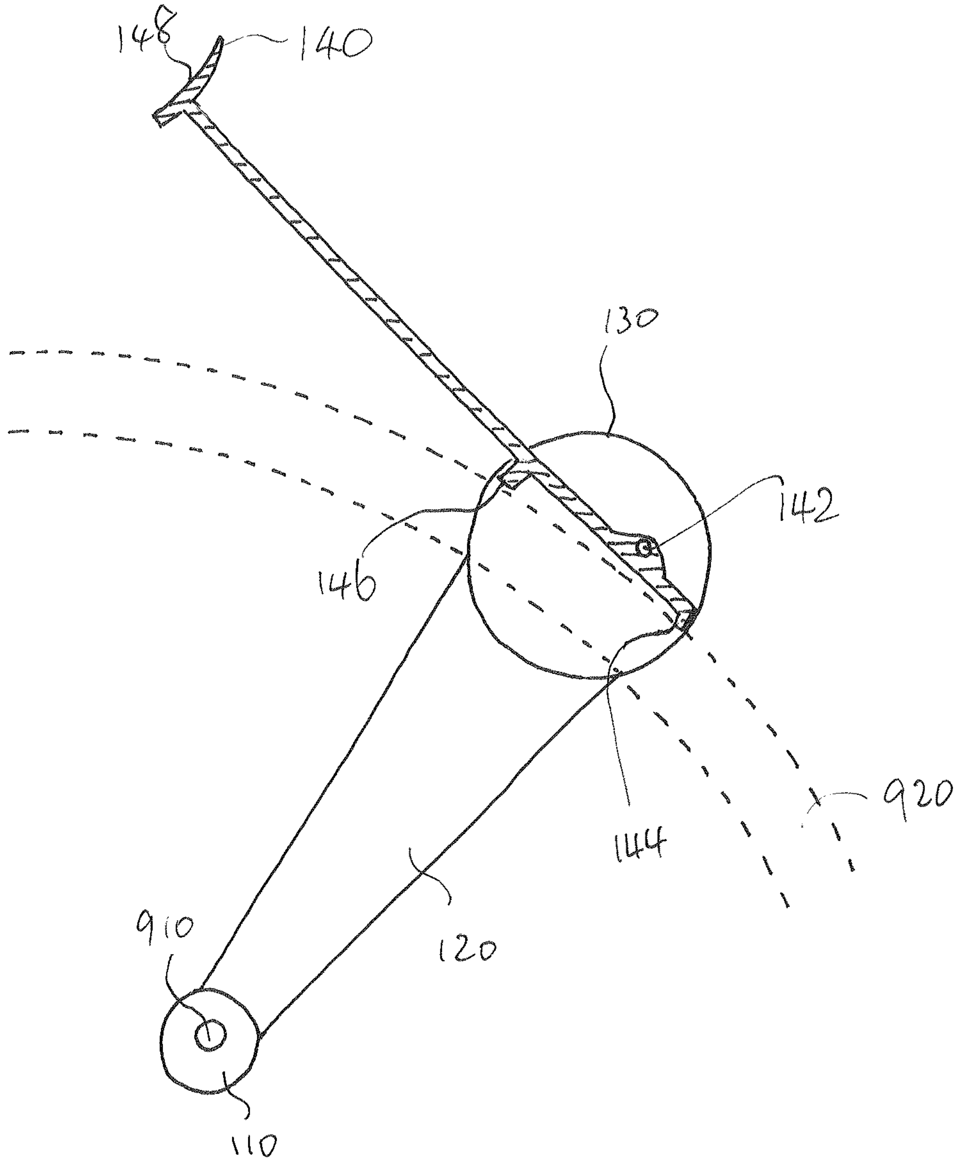
FIG. 2 is a side plan view showing a power handle of a wheelchair device, engaging a wheel in a first position, according to an embodiment of the present invention.
Figure 3:
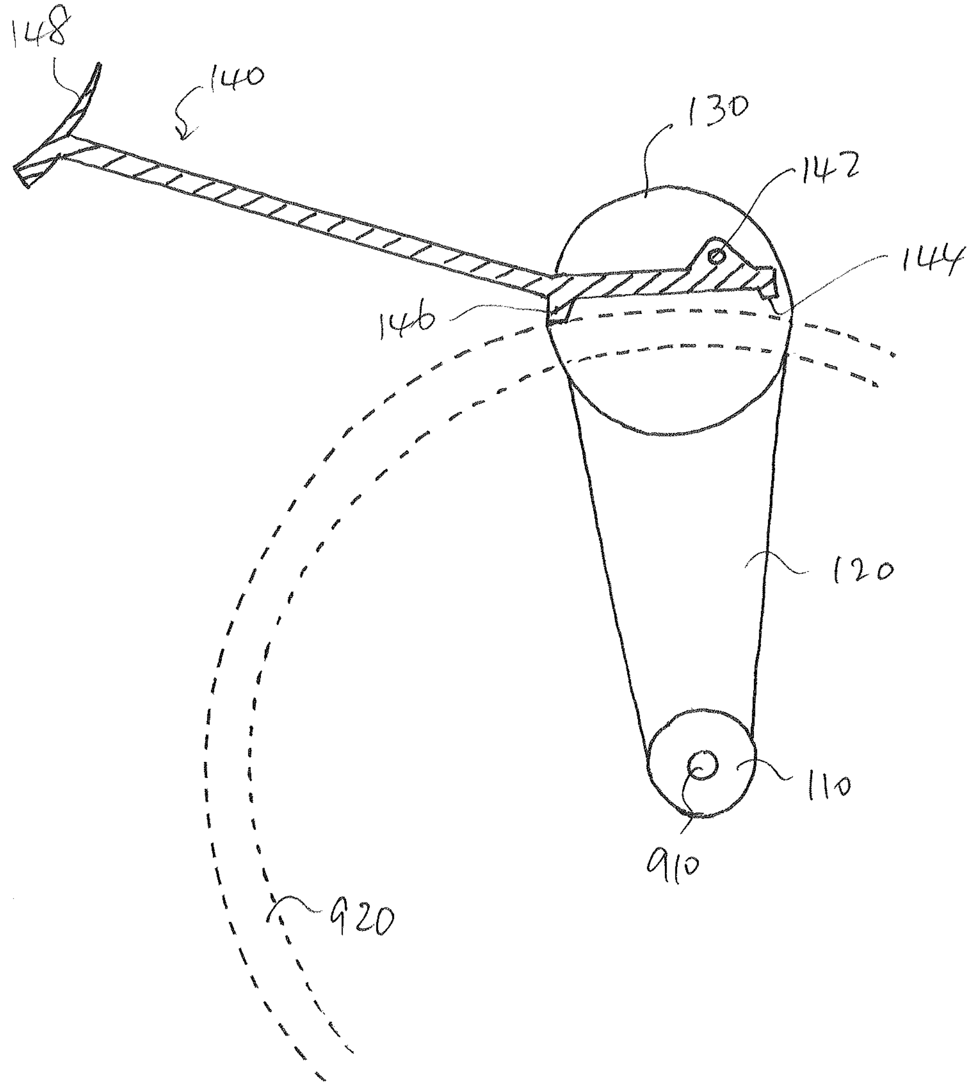
FIG. 3 is another side plan view showing a power handle of a wheelchair device, engaging a wheel in a second position.

The front wheel-holding protrusion 146 may be larger than the rear wheel-holding protrusion 144. The hinge 142 may be disposed closer to the rear wheel-holding protrusion 144 than to the front wheel-holding protrusion 146 as shown in FIGS. 1-3.

The power handle 140 may further comprise a grabbing portion 148 at an end opposite to the rear wheel-holding protrusion 144 with respect to the hinge 142.

Each of the front and rear wheel-holding protrusions 144, 146 from the power handle 140 may engage the wheel 920 with frictional force so as not be slipped by pressing down or lifting up the grabbing portion 148 of the power handle 140, respectively.

The hub-supporting disc 110 may engage and rotate about the hub 910 substantially frictionlessly.

The hub-supporting disc 110 may engage the hub 910 firmly such that the arm 120 and the outer disc 130 keep a constant distance from the wheel 920.

Figure 4:
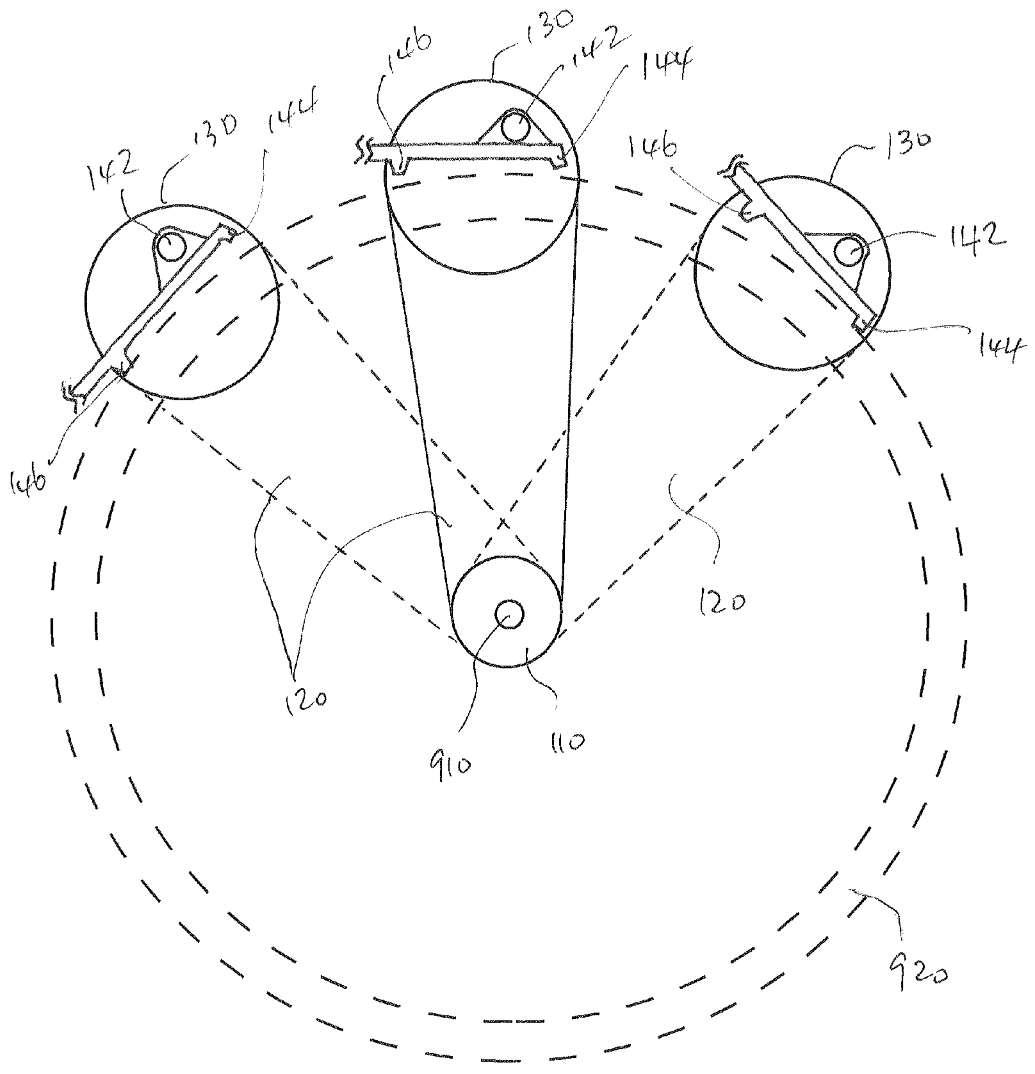
FIG. 4 is a schematic diagram showing various positions of a power handle for operating the wheelchair device.
Figure 5:
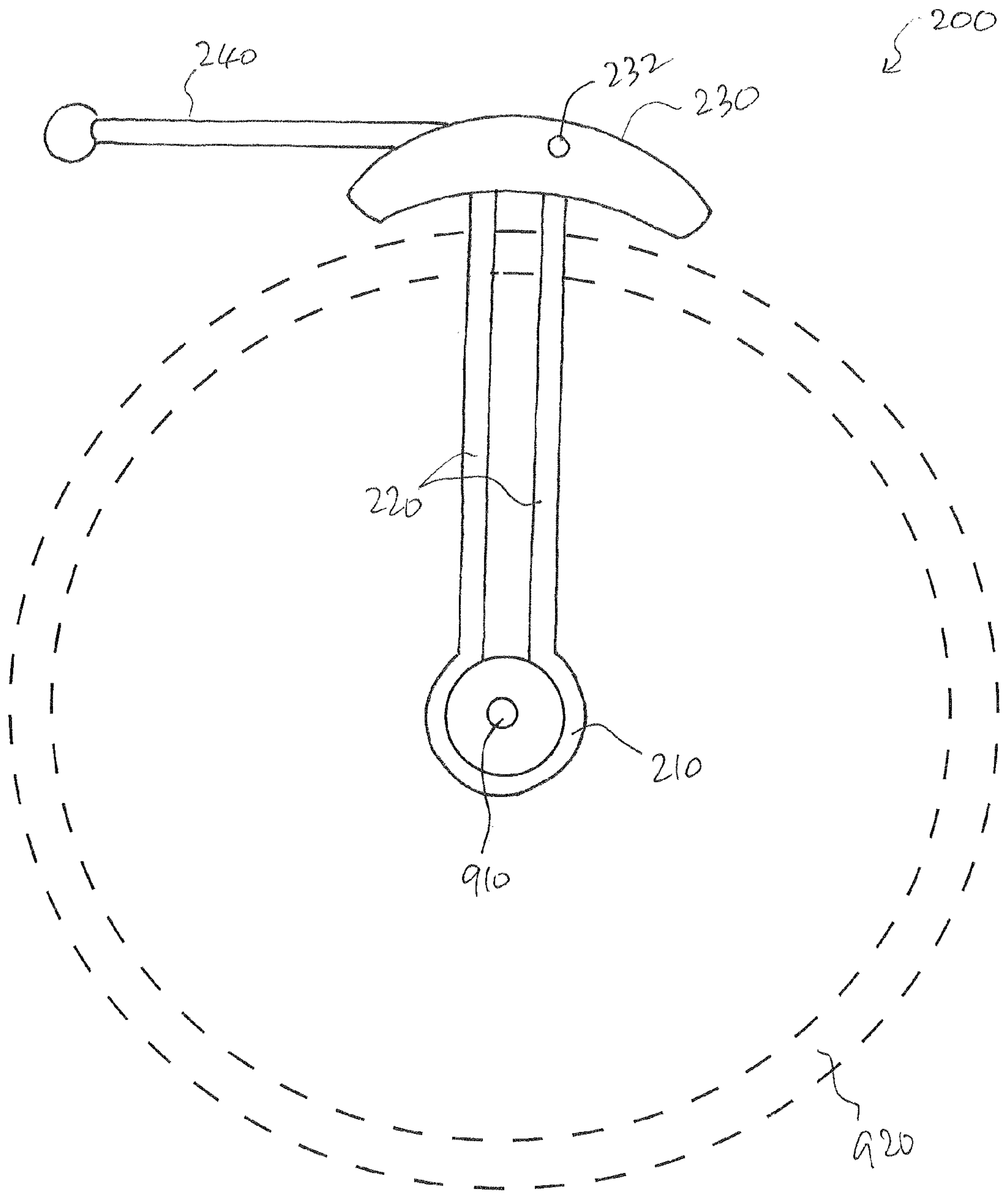
FIG. 5 is a side plan view showing a power handle according to another embodiment of the present invention.
Figure 6:
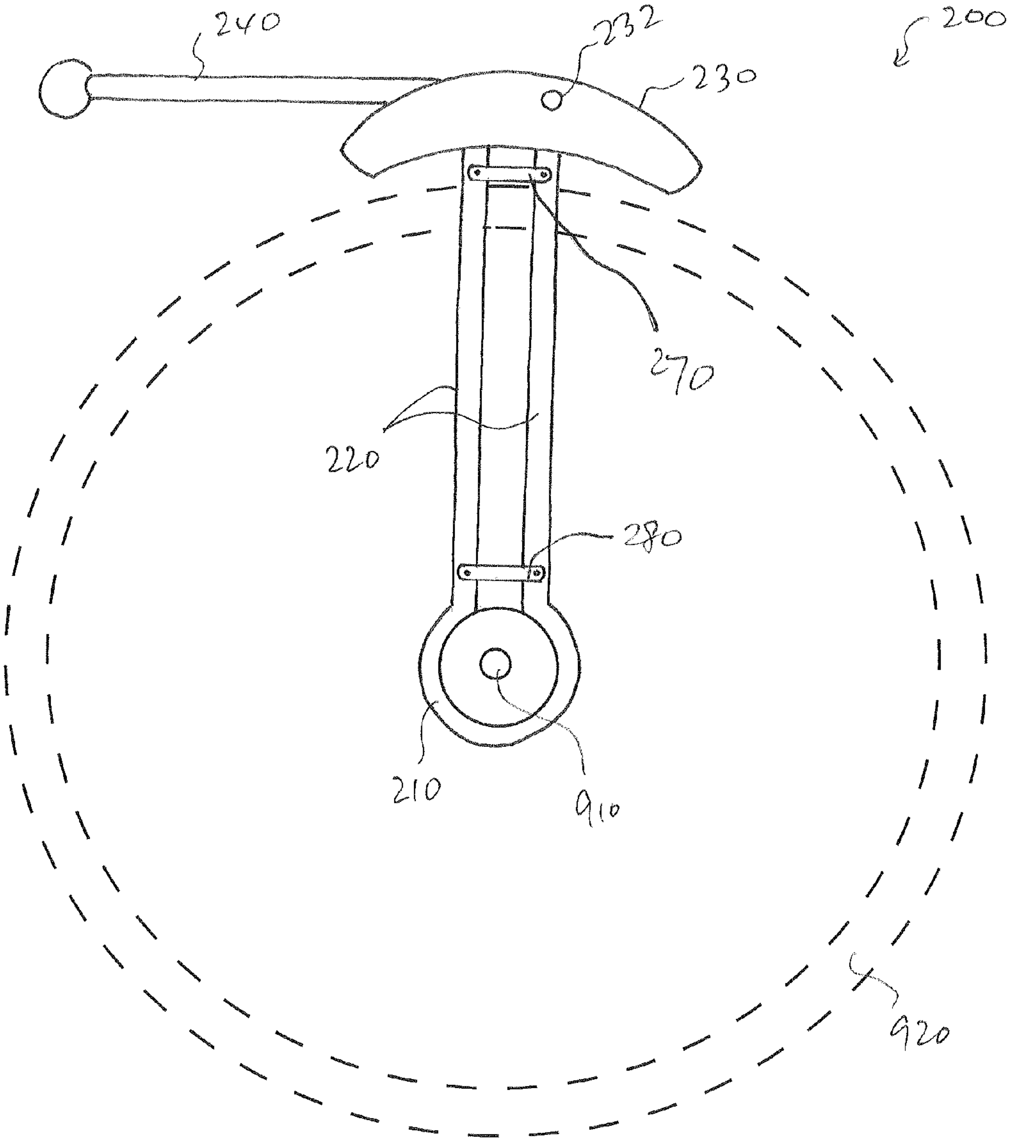
FIG. 6 is a side plan view showing a power handle according to still another embodiment of the present invention.
Figure 7:
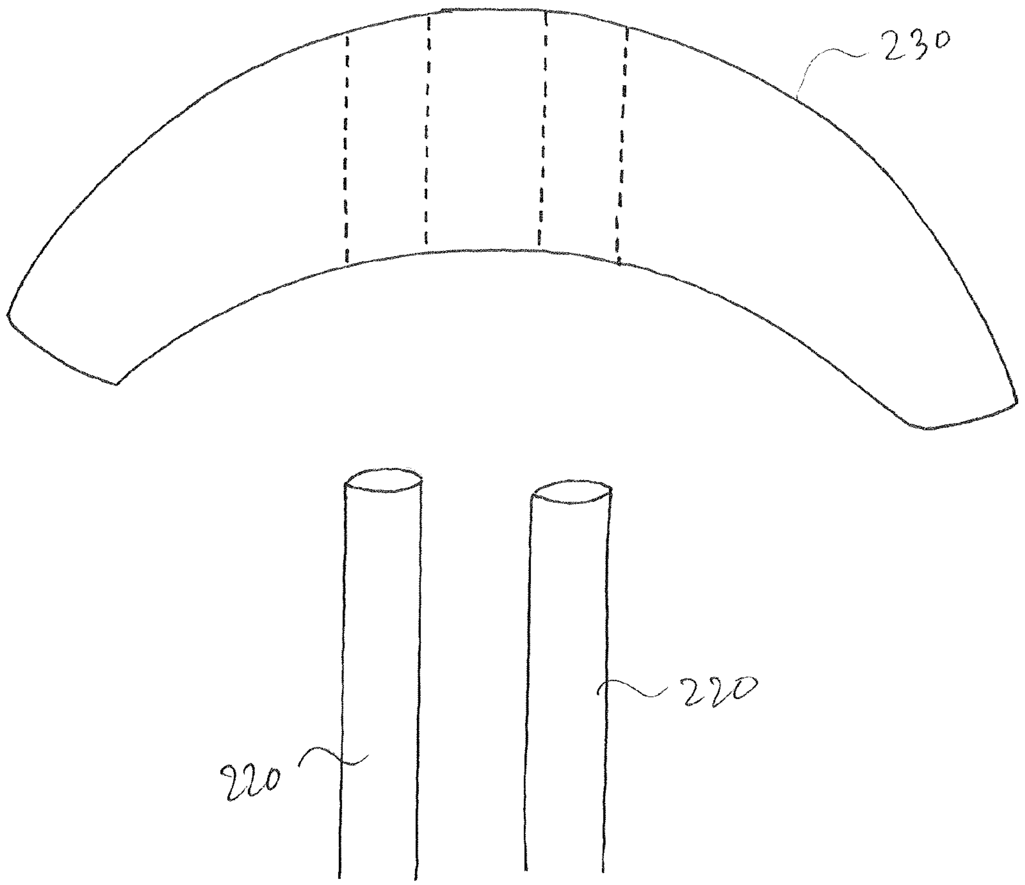
FIG. 7 is a side view showing a crescent-shaped cap member connected to arms according to an embodiment of the present invention.
Figure 8:
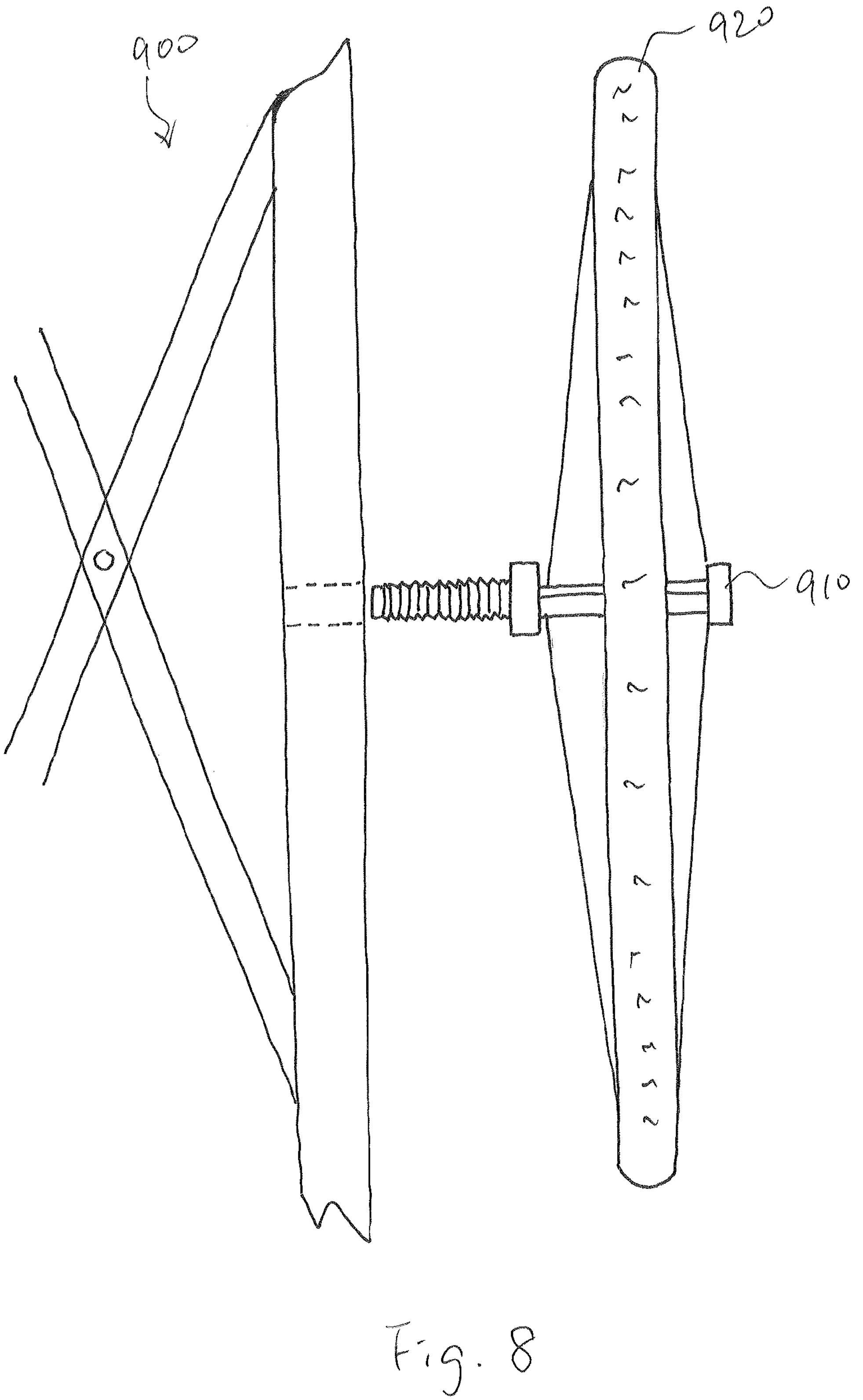
FIG. 8 is a side view showing a wheel engaging frames of the wheelchair according to an embodiment of the present invention.
Figure 9:
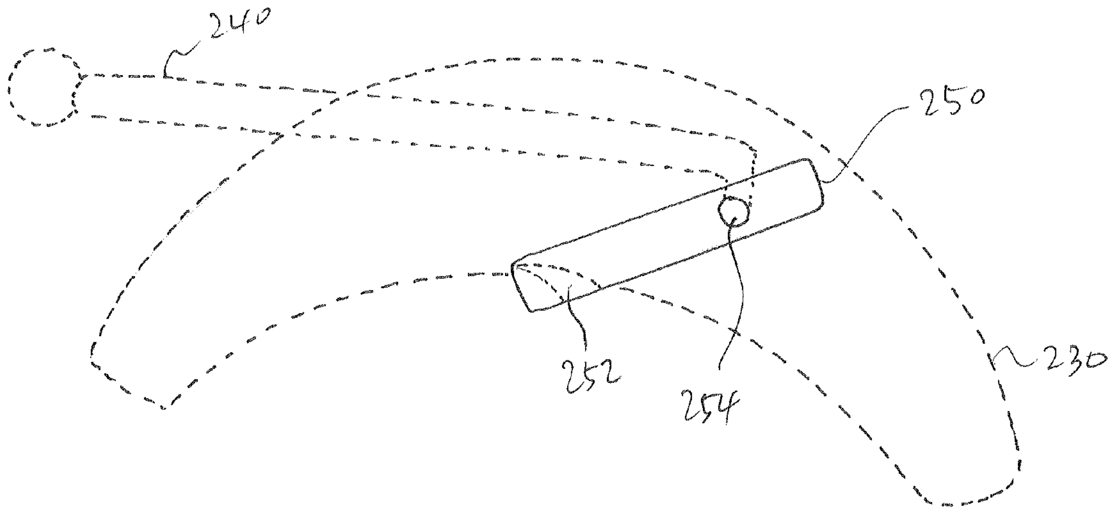
FIG. 9 is a side view showing a wheel-holding plate according to an embodiment of the present invention.

The power handle 140 may be adapted to rotate freely about the hub 910 without engaging both of the front and rear wheel-holding protrusions 144, 146 with the wheel 920 as shown in FIG. 4.

Another aspect of the invention provides a wheelchair device 200 for a wheelchair shown in FIGS. 5-18.

And the wheelchair device 200 comprises:

a hub-enclosing open ring 210 engaging a hub 910 disposed in a wheel 920 of the wheelchair 900 rotatably;

a pair of bars 220 extending from two ends of the hub-enclosing open ring 210 toward a tube portion of the wheel 920;

an crescent-shaped cap member 230 fixed to the pair of bars above the tube portion of the wheel;

a power handle 240 engaging the crescent-shaped cap member 230 rotatably through an L-shaped end of the power handle 240;

a wheel-holding plate 250 fixed to the power handle 240 with a predetermined angle and covered by the crescent-shaped cap member 230, wherein the wheel-holding plate 250 comprises a holding edge 252 for pressing down on and holding the wheel 910 of the wheelchair 900.

The hub-enclosing open ring 210, the pair of bars 220, and the crescent-shaped cap member 230 are fixed to one another and configured to rotate about the hub 910.

The holding edge 252 of the wheel-holding pate 250 is configured to be pressed down on and engaged firmly to the wheel 920 such that the wheel 920 rotates about the hub 910 by pushing and pulling the power handle 240.

The hub-enclosing open ring 210 may be configured to be off-centered from the hub 910, such that the crescent-shaped cap member 230 and the wheel-holding plate 250 is raised from or lowered to the wheel 920.

The crescent-shaped cap member 230 and the wheel-holding plate 250 may be raised from or lowered to the wheel 920 by raising or lowering the power handle 240.

The power handle 240 may engage the crescent-shaped cap member 230 by queuing the L-shaped end of the power handle 240 rotatably through a pair of axle-holes 232 provided in the crescent-shaped cap member 230.

Figure 14:
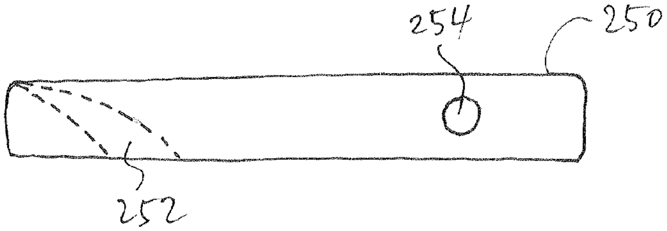
FIG. 14 is a side view of the wheel-holding plate of FIG. 13.
Figure 16:
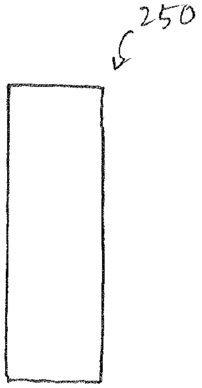
FIG. 16 is a front view of the wheel-holding plate of FIG. 13.
Figure 15:
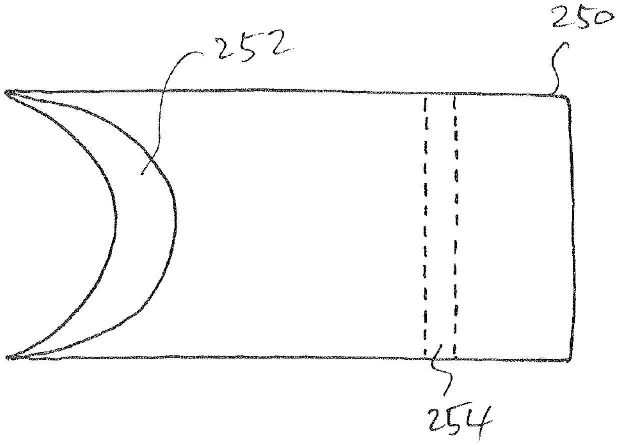
FIG. 15 is a top view of the wheel-holding plate of FIG. 13.
Figure 17:
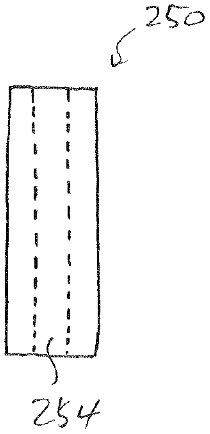
FIG. 17 is a rear view of the wheel-holding plate of FIG. 13.
Figure 18:
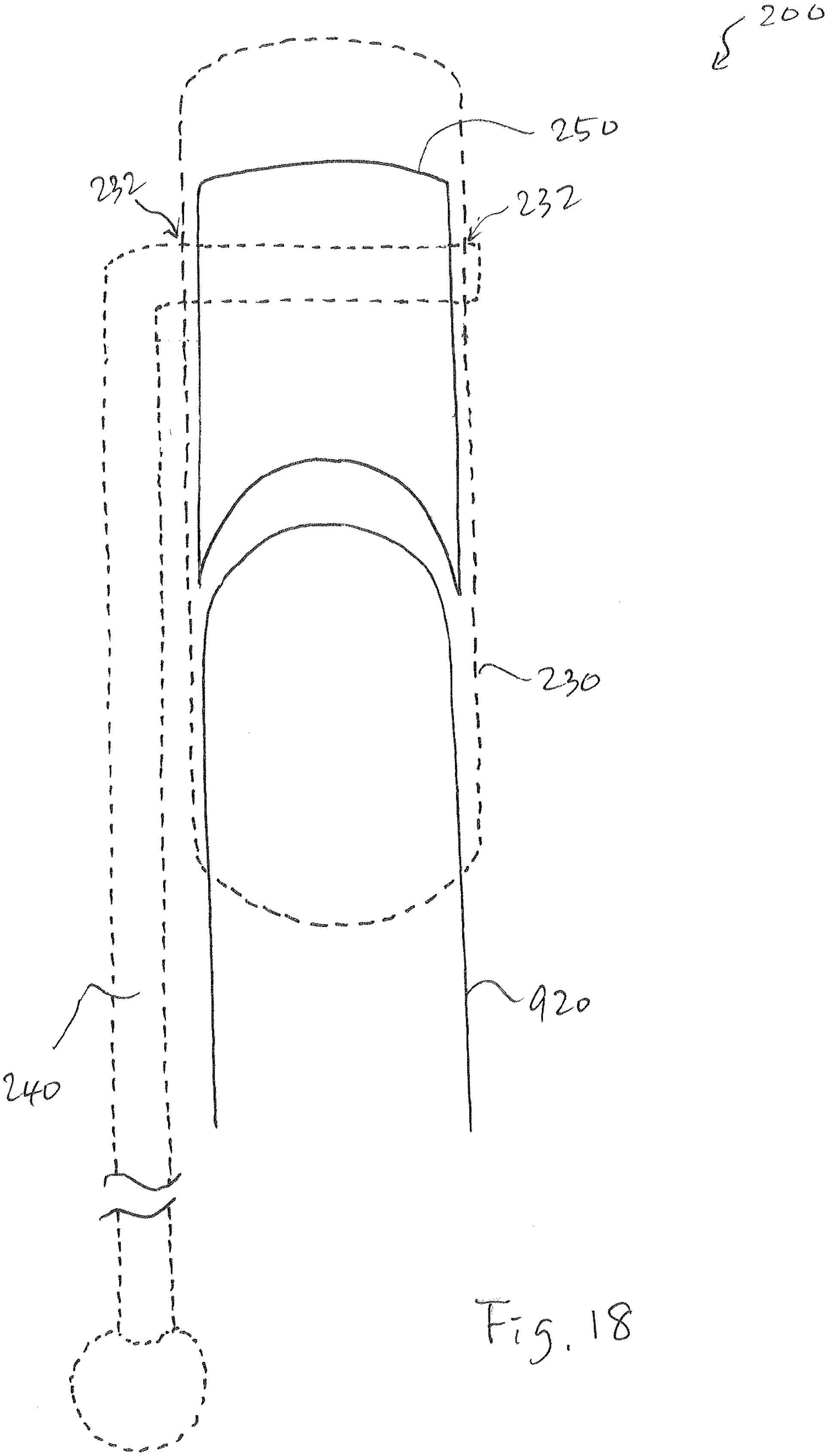
FIG. 18 is a top perspective view showing the wheel-holding plate of FIG. 13 engaging the power handle and the crescent-shaped cap member according to an embodiment of the present invention.

The wheel-holding plate 250 may be fixed to the power handle 240 by queuing the L-shaped end of the power handle 240 fixedly through a fixing hole 254 provided in the wheel-holding plate 250 as shown in FIGS. 14-15.

Figure 10:
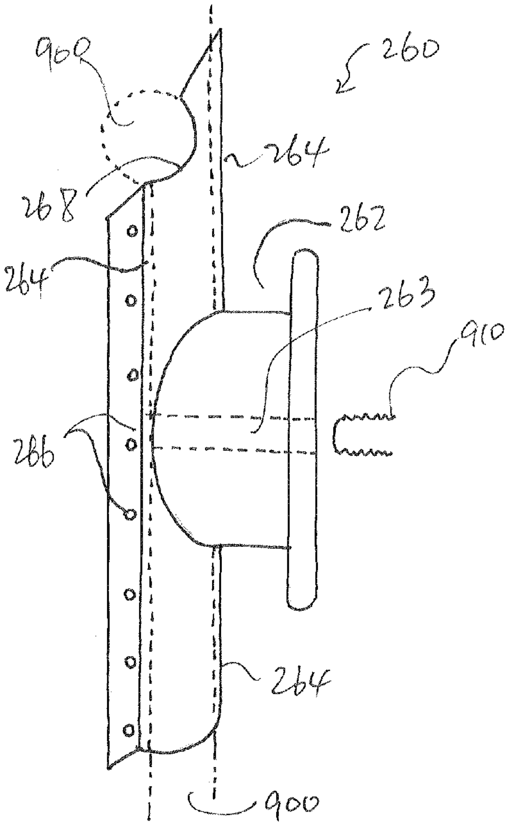
FIG. 10 is a side view showing a hub-adapting member according to an embodiment of the present invention.
Figure 11:
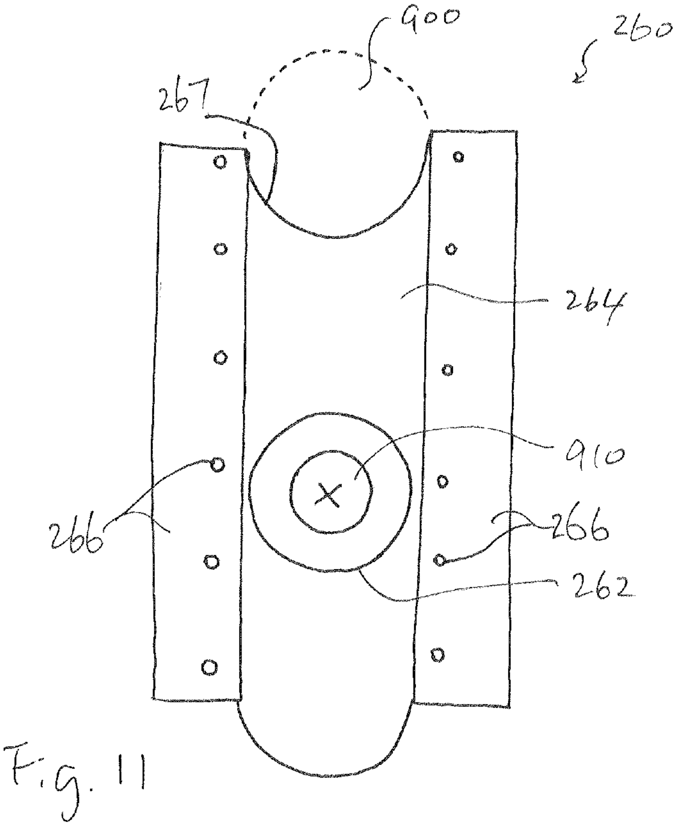
FIG. 11 is a front view showing the hub-adapting member of FIG. 10.
Figure 12:
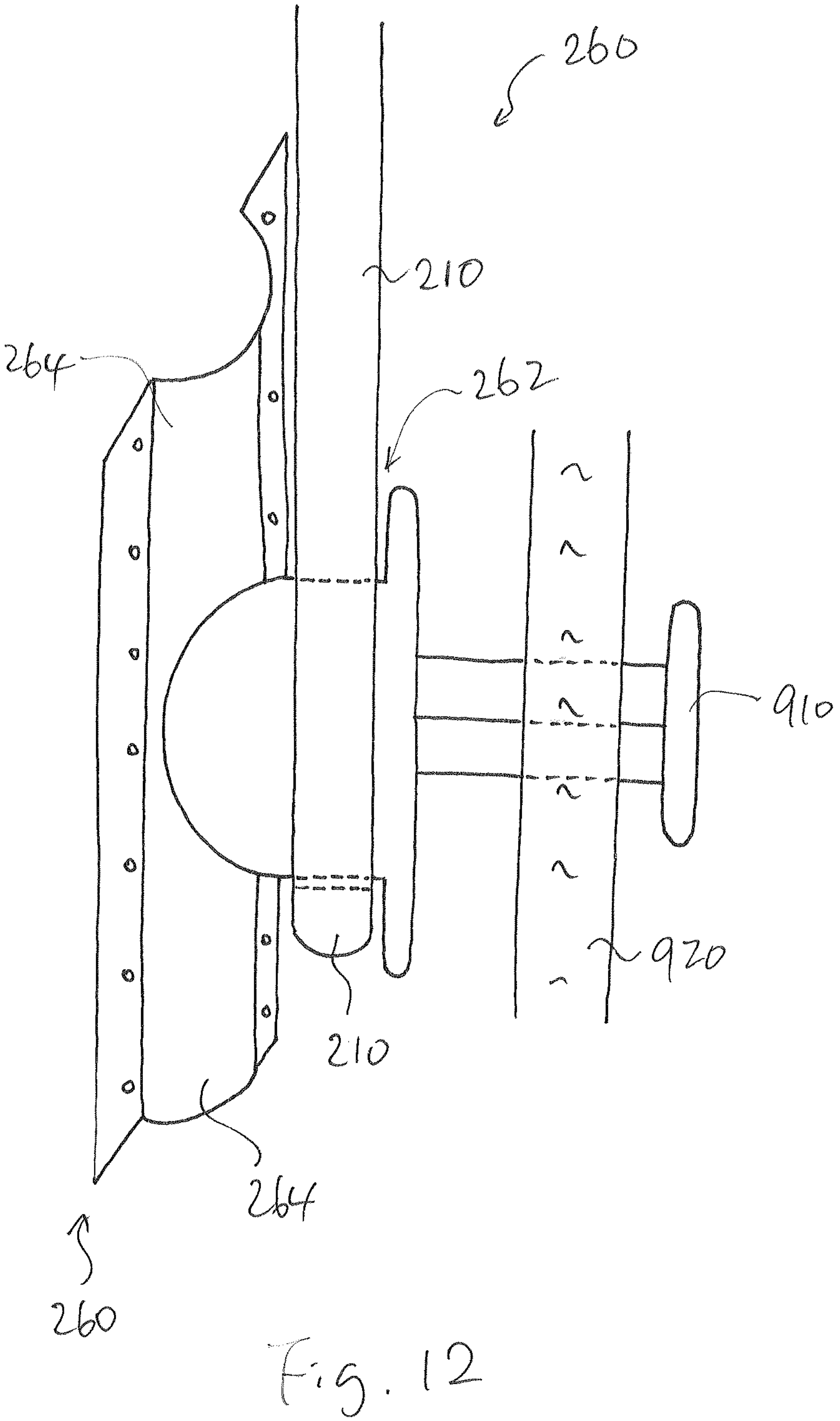
FIG. 12 is a side view showing the hub-adapting member of FIG. 10 engaging arms according to an embodiment of the present invention.
Figure 13:
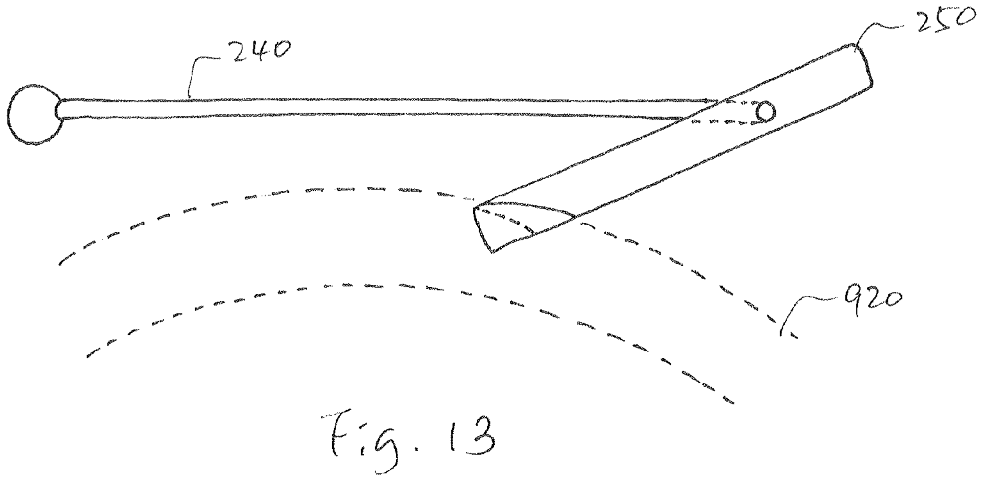
FIG. 13 is a side view showing a wheel-holding plate connected to a power handle according to an embodiment of the present invention.

The wheelchair device 200 may further comprise a hub-adapting member 260 installed around the hub 910 as shown in FIGS. 10-12. The hub-adapting member 260 comprises:

a reel-shaped portion 262 adapted to receive the hub-enclosing open ring 210 around thereof and a through-hole 263 in the center for the axle 910 of the wheel 920;

a base portion 264 fixed to a bottom end of the reel-shaped portion 262, wherein the base portion 264 is adapted to engage frames of the wheelchair 200;

a fastening portion 266 provided around the base portion 264 and configured to fasten the hub-adapting member 260 to the wheelchair 200.

The base portion 264 may comprise one or more vertical grooves 267 and horizontal grooves 268 that fit the frame of the wheelchair 200 as shown in FIGS. 10 and 11.

The fastening portion 266 may comprise a plurality of bolts and nuts, which are adapted to fasten the hub-adapting member 260 to the frames of the wheelchair 200.

The wheelchair device 200 may further comprise a top limiter 270 disposed between the pair of bars 220 below the crescent-shaped cap member 230 for keeping the crescent-shaped cap member 230 from falling down and a bottom limiter 280 disposed between the pair of bars 220 above the hub-enclosing open ring 210 for keeping the hub-enclosing open ring 210 from being disengaged entirely from the hub 910.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A wheelchair device for a wheelchair, the wheelchair device comprising:
- a hub-supporting disc engaging a hub disposed in a wheel of the wheelchair rotatably;
- an arm extending from the hub-supporting disc toward a tube portion of the wheel;
- an outer disc fixed to an end of the arm;
- a power handle engaging the outer disc with a hinge hooked at an axle fixed to the outer disc rotatably, wherein the hinge is disposed at a position close to an end of the power handle;
- a rear wheel-holding protrusion extending inward from an end of the power handle; and
- a front wheel-holding protrusion extending inward from a position opposite to the rear wheel-holding protrusion with respect to the hinge,
- wherein the hub-supporting disc, the arm, and the outer disc are fixed to one another and configured to rotate about the hub,
- wherein each of the rear wheel-holding protrusion and the front wheel-holding protrusion are engaged firmly on the wheel such that the wheel rotate about the hub by pushing and pulling the power handle.

2. The wheelchair device of claim 1, wherein the outer disc has a shape of circle.

3. The wheelchair device of claim 2, wherein the axle on the outer disc is disposed at an off-center location of the a surface of the outer disc and protrudes perpendicularly from the surface.

4. The wheelchair device of claim 1, wherein the front wheel-holding protrusion is larger than the rear wheel-holding protrusion.

5. The wheelchair device of claim 4, wherein the hinge is disposed closer to the rear wheel-holding protrusion than to the front wheel-holding protrusion.

6. The wheelchair device of claim 1, wherein the power handle further comprises a grabbing portion at an end opposite to the rear wheel-holding protrusion with respect to the hinge.

7. The wheelchair device of claim 6, wherein each of the front and rear wheel-holding protrusions from the power handle engages the wheel with frictional force so as not be slipped by pressing down or lifting up the grabbing portion of the power handle, respectively.

8. The wheelchair device of claim 1, wherein the hub-supporting disc engages and rotates about the hub substantially frictionlessly.

9. The wheelchair device of claim 1, wherein the hub-supporting disc engages the hub firmly such that the arm and the outer disc keep a constant distance from the wheel.

10. The wheelchair device of claim 1, wherein the power handle is adapted to rotate freely about the hub without engaging both of the front and rear wheel-holding protrusions with the wheel.

11. A wheelchair device for a wheelchair, the wheelchair comprising:
- a hub-enclosing open ring engaging a hub disposed in a wheel of the wheelchair rotatably;
- a pair of bars extending from two ends of the hub-enclosing open ring toward a tube portion of the wheel;
- an crescent-shaped cap member fixed to the pair of bars above the tube portion of the wheel;

a power handle engaging the crescent-shaped cap member rotatably through an L-shaped end of the power handle;

a wheel-holding plate fixed to the power handle with a predetermined angle and covered by the crescent-shaped cap member, wherein the wheel-holding plate comprises a holding edge for pressing down on and holding the wheel of the wheelchair, wherein the hub-enclosing open ring, the pair of bars, and the crescent-shaped cap member are fixed to one another and configured to rotate about the hub, wherein the holding edge of the wheel-holding pate is configured to be pressed down on and engaged firmly to the wheel such that the wheel rotates about the hub by pushing and pulling the power handle.

12. The wheelchair device of claim 11, wherein the hub-enclosing open ring is configured to be off-centered from the hub, such that the crescent-shaped cap member and the wheel-holding plate is raised from or lowered to the wheel.

13. The wheelchair device of claim 12, wherein the crescent-shaped cap member and the wheel-holding plate is raised from or lowered to the wheel by raising or lowering the power handle.

14. The wheelchair device of claim 11, wherein the power handle engages the crescent-shaped cap member by queuing the L-shaped end of the power handle rotatably through a pair of axle-holes provided in the crescent-shaped cap member.

15. The wheelchair device of claim 11, wherein the wheel-holding plate is fixed to the power handle by queuing the L-shaped end of the power handle fixedly through a fixing hole provided in the wheel-holding plate.

16. The wheelchair device of claim 11, further comprising a hub-adapting member installed around the hub, wherein the hub-adapting member comprises:

a reel-shaped portion adapted to receive the hub-enclosing open ring around thereof and a through-hole in the center for the axle of the wheel;

a base portion fixed to a bottom end of the reel-shaped portion, wherein the base portion is adapted to engage frames of the wheelchair;

a fastening portion provided around the base portion and configured to fasten the hub-adapting member to the wheelchair.

17. The wheelchair device of claim 16, wherein the base portion comprises one or more vertical grooves and horizontal grooves that fit the frame of the wheelchair.

18. The wheelchair device of claim 16, wherein the fastening portion comprises a plurality of bolts and nuts.

19. The wheelchair device of claim 11, further comprising a top limiter disposed between the pair of bars below the crescent-shaped cap member for keeping the crescent-shaped cap member from falling down and a bottom limiter disposed between the pair of bars above the hub-enclosing open ring for keeping the hub-enclosing open ring from being disengaged entirely.

* * * * *